United States Patent [19]
Clungeon et al.

[11] Patent Number: 5,492,956
[45] Date of Patent: Feb. 20, 1996

[54] LOW ORGANIC CHLORINE WET STRENGTH RESIN COMPOSITION AND METHODS OF MAKING THE SAME

[75] Inventors: Nancy S. Clungeon, Tega Cay, S.C.; Stephen A. Fischer, Yardley, Pa.

[73] Assignee: Henkel Corporation, Plymouth Meeting, Pa.

[21] Appl. No.: 391,316

[22] Filed: Feb. 21, 1995

Related U.S. Application Data

[63] Continuation of Ser. No. 165,779, Dec. 10, 1993, abandoned.

[51] Int. Cl.$^6$ ................. C08G 69/26; C08G 69/34; C08L 63/00
[52] U.S. Cl. ................. 524/386; 524/800; 528/405; 162/164.3; 162/164.6
[58] Field of Search ................. 524/386, 800; 528/405; 162/164.3, 164.6

[56] References Cited

U.S. PATENT DOCUMENTS

| | | | |
|---|---|---|---|
| 5,116,887 | 5/1992 | Fischer et al. | 523/400 |
| 5,120,773 | 6/1992 | Fischer et al. | 523/400 |
| 5,189,142 | 2/1993 | Devore et al. | 528/339.3 |
| 5,239,047 | 8/1993 | Devore et al. | 528/339.3 |
| 5,364,927 | 11/1994 | Devore | 524/800 |

FOREIGN PATENT DOCUMENTS 0508203  10/1992  European Pat. Off. .

*Primary Examiner*—Melvyn J. Marquis
*Assistant Examiner*—D. R. Wilson
*Attorney, Agent, or Firm*—Ernest G. Szoke; Wayne C. Jaeschke; Real J. Grandmaison

[57] ABSTRACT

Method of preparing a wet-strength resin of the polyamine-epichlorohydrin type in which the E/N ratio is from about 1.0 to about 1.20 and the reaction temperature is no higher than 50° C., and wet-strength resins having high wet-strength and low amounts of chlorinated compounds produced by said method.

3 Claims, No Drawings

LOW ORGANIC CHLORINE WET STRENGTH RESIN COMPOSITION AND METHODS OF MAKING THE SAME

This application is a continuation of application Ser. No. 08/165,779 filed on Dec. 10, 1993, now abandoned.

BACKGROUND OF THE INVENTION

1. Field of the Invention

The present invention relates to wet strength resin compositions and methods of making the same and particularly to improved polyamine-epichlorohydrin wet strength resins.

2. Description of Related Art

Polyamine-epichlorohydrin resins have been used as wet strength resins for paper since the early 1950's. Such resins are cationic and are particularly useful because they are formaldehyde-free and develop wet strength at neutral or alkaline pH values.

One of the drawbacks associated with the use of polyamine-epichlorohydrin resins is the emission of harmful chlorinated compounds into the water systems of pulp and paper mills. These chlorinated compounds, including 1,3-dichloro-2-propanol, epichlorohydrin and 1-chloro-2,3-propanediol, are usually discharged into the effluent waste water systems because they are only partially substantive to cellulose pulp fibers. The permissible amounts of these chlorinated compounds is decreasing and therefore efforts have been made to reduce the amounts of these materials.

Stephen A. Fischer et al, U.S. Pat. Nos. 5,116,887 and 5,120,773 disclose methods of preparing polyamine-epichloro-hydrin resins under conditions which reduce the amount of volatile organic compounds. In particular, a polyamine solution and epichlorohydrin are combined to form a reaction mixture having a relatively high E/N ratio of from about 1.0 to about 1.4 which is reacted at a relatively high temperature of 50° to 80° C.

European Patent Publication No. 0 508 203 discloses low chlorine component resins produced by the reaction of an epihalohydrin and a polyalkylene polyamine in which the E/N ratio is relatively low (i.e. less than 1.0) and the reaction temperature is also relatively low (i.e. less than 60° C., typically about 25° to 45° C.

A low E/N ratio of 0.6 to 1.08 and a low reaction temperature of about 5° to 30° C. have been used to reduce chlorides in an aminopolyamide-epichlorohydrin resin as disclosed in Devore et al. U.S. Pat. Nos. 5,239,047 and 5,189,142.

SUMMARY OF THE INVENTION

The present invention is directed to a process for preparing polyamine-epichlorhydrin wet strength resins having very low amounts of undesirable chlorinated by-products.

In particular the present process comprises the steps of (a) providing a water-polyol-polyamine solution; (b) adding to said solution epichlorohydrin at a rate sufficient to form a reaction mixture having an E/N ratio of from about 1.0 to about 1.20; (c) maintaining the temperature of said reaction mixture in a range of up to 50° C., preferably in the range of about 40° to 50° C. The resulting resins have a total organic chloride content of typically less than 1.0%, preferably less than 0.50%.

DETAILED DESCRIPTION OF THE INVENTION

The present invention is premised on the discovery that the reaction of polyamine and epichlorohydrin will yield very low amounts of undesirable chlorinated compounds if the reaction is conducted at a relatively high E/N ratio and a relatively low reaction temperature. In addition, the resulting resin exhibits good wet strength properties as determined by measuring the strength of paper sheets made with the resin of the present invention.

The wet strength resin composition is made by reacting a polyamine and epichlorohydrin in an aqueous polyol solution. A polyamine is any amine that has at least two amine functionalities such as a simple diamine (e.g. ethylene diamine) or more than two amine functionalities such as diethylene triamine, triethylenetetramine, and bis-hexamethylenetriamine and the like. Preferably, the polyamine is a mixture of polyamines known as amine still bottoms which is a mixture of polyamines containing from about 35% by weight to about 70% by weight bis-hexamethylenetriamine. It has been found that at least one polyol is a necessary component of the reaction because it performs the dual function of a cosolvent and a moderator of the cross-linking reaction.

The polyol component of the wet strength resin composition can be any aliphatic compound having two or more hydroxyl functionalities that is miscible with water or combinations thereof. Examples of such polyols include ethylene glycol, 1,2-propylene glycol, 1,3-propylene glycol, diethylene glycol, dipropylene glycol, triethylene glycol, 1,6-hexylene glycol, glycerol, monosaccharides such as glucose or fructose, disaccharides such as sucrose, and polyvinyl alcohol. The preferred polyols are 1,2-propylene glycol and dipropylene glycol because they are generally recognized as safe, have flash points >200° C. and are good co-solvents for the polyamine-epichlorohydrin reaction. A preferred wet strength resin composition contains less than 1.0% by weight of chlorinated by-products, preferably less than 0.50% by weight.

The process of the present invention is conducted generally by adding epichlorohydrin to a water-polyol-polyamine solution at a rate sufficient to maintain the temperature of the solution in a range of from about 5° C. to about 15° C. to form a reaction mixture having an E/N ratio of from about 1.0 to about 1.20. The exothermic temperature of the reaction in accordance with the present invention is no higher than 50° C., preferably in the range of from 40° to 50° C. The reaction is conducted at this temperature until about a 35% solids solution of the reaction mixture has a viscosity of at least 70 cps. The pH of the reaction mixture is then adjusted to about 3 with an aqueous acid solution.

The process of the present invention is commenced by first preparing a water-polyol-polyamine solution. A preferred method of preparing this solution is to add an amine bottoms solution having a total alkalinity of about 38% and a solids content of about 50% to a reaction vessel. Water and a polyol, preferably propylene glycol are added to the reaction vessel and the contents mixed while cooling to about 5° C. The epichlorohydrin is then added at a rate sufficient to maintain the temperature of the solution in the range of from about 5° C. to about 15° C., preferably about 5° to 10° C. to form a reaction mixture having an E/N ratio of from about 1.0 to about 1.20.

The E/N ratio is defined as:

$$\frac{\text{wt. of epichlorohydrin/wt. of amine bottoms solution}}{[\% \text{ total alkalinity of amine bottoms solution}/5611] \times 92.5}.$$

The number 5611 represents the equivalent weight of potassium hydroxide (KOH) which is 56.11, multiplied by 100. The E/N ratio can vary from about 1.0 to 1.20 and is preferably in the range of from about 1.10 to 1.20, most preferably 1.15 to 1.20. The absolute amount of amine+ epichlorohydrin can be from about 10% by weight to about 70% by weight of the reaction mixture with about 35% to 60% by weight being the preferred amount. The reaction is allowed to proceed at a temperature in the range of no higher than 50° C., preferably from about 40° to 50° C., preferably until about a 35% solids solution has a viscosity of at least 70 cps (Brookfield, spindle #2@60 r.p.m., 25° C.). The reaction is then quenched by adding water to bring the total solids to about 35% and the pH is adjusted to about less than 7 by addition of aqueous acid preferably aqueous HCl.

and soaked for 1 hour in water at 25° C. Tensile strength was determined on an Instron Tensile Tester using a 10 lb. load cell. The percent wet strength referred to in Table 1 is defined as the ratio of the wet tensile divided by the dry tensile times 100 of a sheet treated with a wet strength resin composition according to the present invention.

The total amount of chlorinated by-products including epichlorohydrin, dichloropropanol and chloropropanediol was determined based on the amount of resin solids. The results are shown in Table 1.

TABLE 1

| Resin | E/N[1] | ECH[4] Addition | | ECH Reaction | | Final | | |
|---|---|---|---|---|---|---|---|---|
| | | Time (Hrs) | Temp (°C.) | Time (hrs) | Temp (°C.) | Visc. (cps) | % WS[2] | % TOCl[3] |
| 1 | 1.18 | 10 | 8 | 7 | 50 | 95 | 14 | 0.50 |
| 2 | 1.18 | 8 | 7 | 12 | 45 | 90 | 16 | 0.37 |
| 3 | 1.18 | 6 | 8 | 4 | 40 | 98 | 18 | 0.24 |
| 4 | 1.15 | 6 | 6 | 3 | 40 | 110 | 14 | 0.26 |
| 5 | 1.18 | 8 | 7 | 3 | 48 | 134 | 15 | 0.74 |
| 6 | 1.00 | 1 | 11 | 4 | 45 | 78 | 11 | 0.18 |
| A | 1.18 | 12 | 10 | 3 | 60 | 95 | 14 | 3.80 |

[1] $E/N = \frac{(\text{wt. of epichlorohydrin/wt. of amine solution})}{(\% \text{ total alkalinity})/5611 \times 92.53}$
[2] % Wet Strength, (Wet Tensile/Dry Tensile) × 100
[3] % TOCl = Sum of epichlorohydrin, dichloropropanol, and chloropropanediol based on resin solids
[4] ECH = epichlorohydrin

EXAMPLE 1

116.8 grams of an BHMT (bishexamethylenetriamine) amine bottoms solution having a total alkalinity of 35.3% and a solids content of 50.49% was added to a suitable reactor. Also charged into the reactor were 23.8 grams of water and 19.2 grams of propylene glycol. The reactor contents were mixed until uniform, cooled to 8° C., and 80.2 grams of epichlorohydrin were added over 10 hours to form an E/N ratio of 1.18. The reaction was then allowed to exotherm to 50° C. and held until a viscosity of a 35% solids solution reached 120 cps. The reaction mass was quenched by adding sufficient water and 37% hydrochloric acid to adjust the resin solids to 35.3% and the pH to 2.5. The final solution viscosity was 95 cps.

The performance of the wet strength resin was determined in accordance with the following:

1. STOCK PREPARATION: Commercial brown stock was diluted to 0.2% consistency to form a stock slurry.
2. HANDSHEET PREPARATION: Blank handsheets were prepared according to the handsheet preparation method outlined in the Mark IV Dynamic Handsheet Mold/Paper Chemistry Jar Assembly operating manual. Treated handsheets were prepared by the same method except a dosage of 8 dry pounds of wet strength resin per ton of dry pulp were manually added to the dispersed stock slurry and the furnish was mixed at 750 r.p.m. for 55 seconds. Handsheets were blotted dry between felt sheets and pressed with a rolling pin in back and forth diagonal directions. The pressed sheets were dried for 10 minutes at 110° C. and cured at the same temperature for an additional 10 minutes.
3. WET TENSILE DETERMINATION: Tensile strips measuring 1"×4" were cut from the treated handsheets As shown in Table 1, the wet-strength resin produced in accordance with the present invention exhibited excellent wet-strength and a low content of chlorinated by-products.

EXAMPLES 2–6

Example 1 was repeated using the process parameters and amounts of the reactants shown in Table 1. As shown in Table 1, Examples 2–6 generally exhibited excellent wet-strength properties while keeping the content of chlorinated by-products to well below 1.0% by weight and typically below 0.50% by weight.

COMPARATIVE EXAMPLE (Resin A)

31.4 parts of an BHMT (bis-hexamethylenetriamine) amine bottoms solution having a total alkalinity of 33.1% and a solids content of 46.5% was added to a suitable reactor. 3.6 parts of water and 4.8 parts of propylene glycol were also added to the reactor. The reactor contents were mixed until uniform, cooled to 10° C., and 20.2 parts of epichlorohydrin were added over 12 hours to form an E/N ratio of 1.18. The reaction was allowed to exotherm to 60° C. and held until a viscosity of a 35% solids solution reached 108 cps. The reaction mass was quenched by adding sufficient water and 31.5% hydrochloric acid to adjust the resin solids to 35.2% and the pH to 2.8. The final solution viscosity was 95 cps.

As shown in Table 1, although the wet-strength of the comparative resin was excellent, the amount of chlorinated by-products (3.80% total organic chloride content) was excessive and undesirable for commercial operations.

What is claimed is:

1. A process for making a polyamine-epichlorohydrin resin comprising:
   (a) providing a water-polyol-polyalkyleneamine solution wherein said polyol is an aliphatic compound having two or more hydroxyl functionalities that is miscible with water;
   (b) adding to said solution epichlorohydrin at a rate sufficient to maintain the reaction temperature of the reaction mixture in a range of from about 5° to about 15° C. during the addition of said epichlorohydrin to said water-polyol-polyalkyleneamine solution to form a reaction mixture having an E/N ratio of from about 1.0 to 1.20 and wherein the reactants are present in a concentration of about 10 to about 70 wt %;
   (c) maintaining the temperature of said reaction mixture in a range of from about 40° C. up to 45° C. after the addition of said epichlorohydrin; and
   (d) adjusting the pH of said reaction mixture to less than about 7 with an aqueous acid solution.

2. The process of claim 1 wherein the E/N ratio is from about 1.15 to about 1.20.

3. The process of claim 1 wherein the reaction mixture temperature in step (c) is maintained until about a 35% by weight solids solution of said reaction mixture has a viscosity of at least 70 cps.

* * * * *